(12) United States Patent
Aaron

(10) Patent No.: US 7,461,398 B2
(45) Date of Patent: Dec. 2, 2008

(54) METHODS, SYSTEMS, AND COMPUTER PROGRAM PRODUCTS FOR DYNAMIC MANAGEMENT OF SECURITY PARAMETERS DURING A COMMUNICATIONS SESSION

(75) Inventor: Jeffrey A. Aaron, Atlanta, GA (US)

(73) Assignee: AT&T Intellectual Property I, L.P., by transfer of ownership from AT&T Delaware Intellectual Property, Inc., Reno, NV (US)

( * ) Notice: Subject to any disclaimer, the term of this patent is extended or adjusted under 35 U.S.C. 154(b) by 826 days.

(21) Appl. No.: 10/970,552

(22) Filed: Oct. 21, 2004

(65) Prior Publication Data

US 2006/0090198 A1 Apr. 27, 2006

(51) Int. Cl.
*H04L 9/32* (2006.01)

(52) U.S. Cl. ....................................................... 726/6
(58) Field of Classification Search ................... 726/12, 726/13, 14, 15, 6, 11, 22, 25; 713/152; 380/270
See application file for complete search history.

(56) References Cited

U.S. PATENT DOCUMENTS

| 6,587,680 | B1* | 7/2003 | Ala-Laurila et al. ......... 455/411 |
| 6,856,676 | B1* | 2/2005 | Pirot et al. ............. 379/201.01 |
| 7,076,797 | B2* | 7/2006 | Loveland ....................... 726/4 |

* cited by examiner

*Primary Examiner*—Ellen Tran
(74) *Attorney, Agent, or Firm*—Myers Bigel Sibley & Sajovec, PA

(57) ABSTRACT

A method of managing security parameters for a communications session includes dynamically assigning security parameters during the communications session responsive to changing aspects of the communications session to provide a variable degree of security for the session. Related systems and computer program products are also discussed.

14 Claims, 8 Drawing Sheets

METHODS, SYSTEMS, AND COMPUTER PROGRAM PRODUCTS FOR DYNAMIC MANAGEMENT OF SECURITY PARAMETERS DURING A COMMUNICATIONS SESSION

FIELD OF THE INVENTION

The present invention relates to communications networks, and, more particularly, to managing security parameters in communications networks.

BACKGROUND OF THE INVENTION

Communications networks are widely used for nationwide and worldwide communication of voice, multimedia and/or data. As used herein, communications networks include public communications networks, such as the Public Switched Telephone Network (PSTN), terrestrial and/or satellite cellular networks and/or the Internet.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

Due to the public accessibility of modern communications networks, users of these networks may be concerned with security and/or privacy. As such, a variety of technical means for ensuring security and/or privacy for information transmitted over communications networks have been developed. However, because of the complexity of these technical mechanisms, considerable expertise may be required to determine optimal security settings among the options available. In other words, users at endpoints of a communications channel may not be able determine the best security choices for their endpoints even if expert advice is occasionally obtained.

SUMMARY OF THE INVENTION

According to some embodiments of the present invention, a method of managing security parameters for a communications session includes dynamically assigning security parameters during the communications session responsive to changing aspects of the communications session to provide a variable degree of security for the session.

In other embodiments, assigning security parameters may include detecting the changing aspects of the communications session for a duration of the communications session, determining appropriate security parameters responsive to the detected aspects, and repeatedly updating current security parameters with the appropriate security parameters during the communications session.

In other embodiments, determining appropriate security parameters may include correlating the detected aspects to predetermined security parameters associated with each of the detected aspects to determine the appropriate security parameters.

In still other embodiments, determining appropriate security parameters may further include filtering the predetermined security parameters based on a software application used for the communications session.

In still other embodiments, determining appropriate security parameters may further include obtaining customer security preferences and associating each of the obtained security preferences with security parameters to update correlation rules and/or the predetermined security parameters. In further embodiments, the customer security preferences may include an overall level of security for the communications session, specific levels of security information for respective details of the communications session, and/or specific levels of trust for respective parties to the communications session.

In some embodiments, the changing aspects may include endpoint-visible information and/or network-visible information for the communications session.

In some embodiments, the endpoint-visible information may include type of communications session, contents of the communications session, devices and/or software applications used for the communications session, method of connection, parties at each endpoint of the communications session, and/or endpoint associated parameters.

In some embodiments, the network-visible information may include communications channel information for the session, customer profile and/or purchased level of service information, network conditions, security rating and/or historical trust level and/or status and/or parameters associated with one or more networks to be traversed in the communications session, owners and/or operators of the networks to be traversed, communications session type, and/or networks connected at and/or between each endpoint of the communication session.

In some embodiments, detecting the changing aspects of the communications session may further include monitoring the communications session for endpoint-visible information and querying the network for network-visible information during the communications session.

In some embodiments, the security parameters may include authentication parameters, encryption parameters, login parameters, and/or hashing parameters.

Embodiments of the invention have been described above primarily with respect to methods of dynamic management of security parameters during a communications session. However, other embodiments of the invention can provide systems for dynamic management of security parameters and computer program products that may be used to dynamically manage security parameters. Other methods, systems, and/or computer program products according to other embodiments of the invention will be or become apparent to one with skill in the art upon review of the following drawings and detailed description. It is intended that all such additional methods, systems, and/or computer program products be included within this description, be within the scope of the present invention, and be protected by the accompanying claims.

DETAILED DESCRIPTION OF EMBODIMENTS OF THE INVENTION

Figure 1:
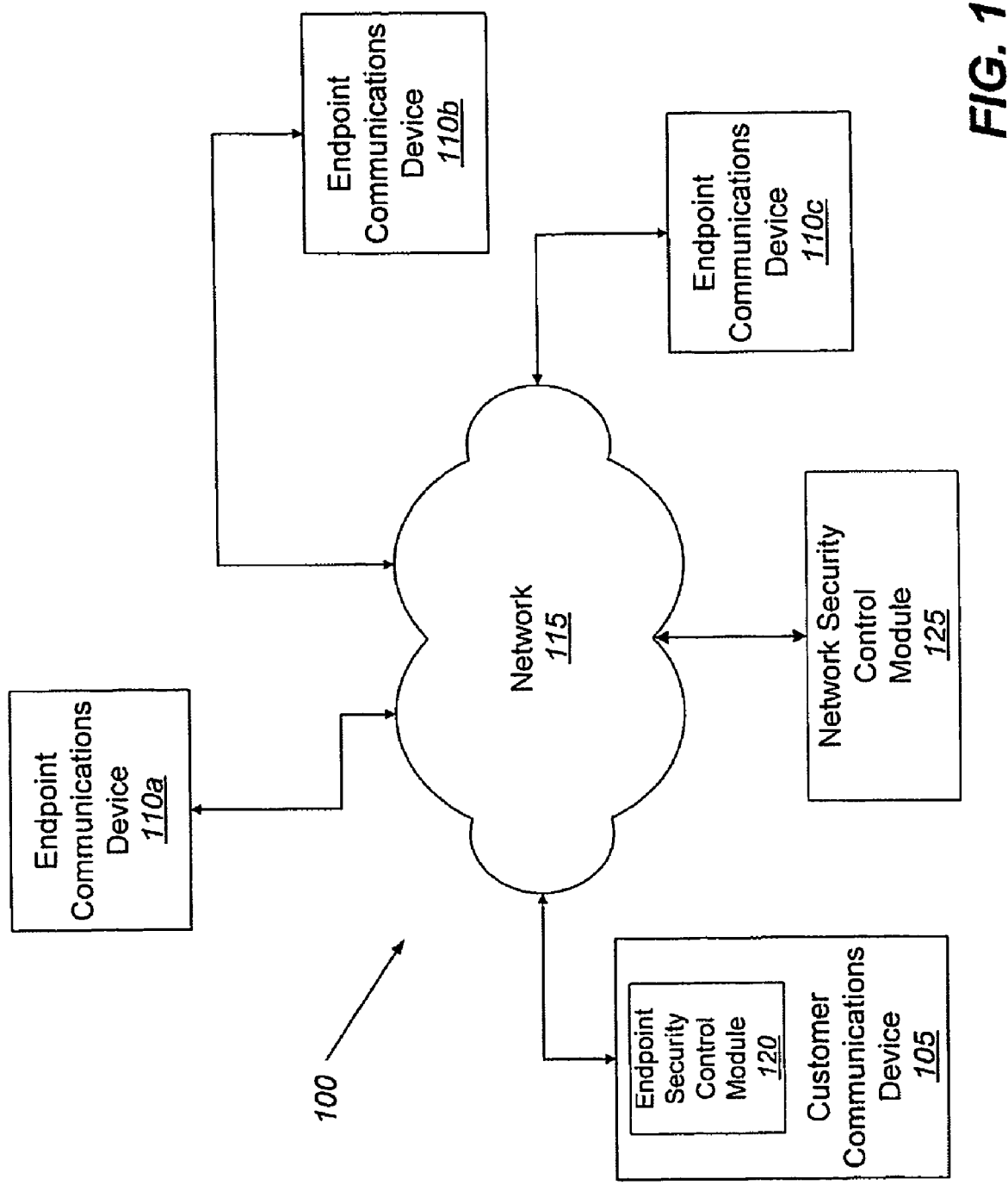
FIG. 1 is a block diagram illustrating a communications network according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. As used herein, the term "and/or" includes any and all combinations of one or more of the associated listed items.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

For purposes of illustration, embodiments of the present invention are described herein with respect to dynamically assigning security parameters during a communications session. It will be understood that the present invention is not limited to such embodiments but may also be embodied generally as managing security parameters for a communications session across a communications network.

Referring now to FIG. 1, an exemplary network architecture 100 for managing security parameters for a communications session, in accordance with some embodiments of the present invention, comprises a customer communications device 105 connected to plurality of endpoint communications devices 110a, 110b, and 110c via a communications network 115 to establish a communications session. An endpoint security control module 120 is included in the customer communications device 105, and a network security control module 125 is connected to the network 115. The network 115 may represent a global network, such as the Internet, or other publicly accessible network. The network 115 may also, however, represent a wide area network, a local area network, an Intranet, or other private network, which may not accessible by the general public. Furthermore, the network 115 may represent a combination of one or more wired and/or wireless public and/or private networks and/or virtual private networks (VPN).

Communications sessions may be digital, analog, wireless, wire-line, radio, telephonic, cellular, IP network (including web surfing, e-mail, instant messenger, Voice-over-IP, and/or videoconferencing) and may be conducted using any type of device or devices capable of data processing, such as a PC, digital or IP phone, cellular phone (analog, GSM, CDMA, etc.), WLAN phone, network-connected PDA, walkie-talkie, and/or radio transceiver. A communications session may have at least two endpoints, with a communicating entity present at each endpoint. The communicating entity may be a person and/or an automated process/application/function. One or more networks, connected one to the next, may lie between any two endpoints.

Still referring to FIG. 1, the endpoint security control module 120 and/or the network security control module 125 may be embodied as one or more enterprise, application, personal, pervasive and/or embedded computing devices that may be interconnected by a wired and/or wireless local and/or wide area network, including the Internet. In some embodiments, the network security control module 125 may be situated in a secure location, such as the central office of a communications services provider. Although FIG. 1 illustrates an exemplary communications network, it will be understood that the present invention is not limited to such configurations, but is intended to encompass any configuration capable of carrying out the operations described herein. For example, while FIG. 1 illustrates only the customer communications device 105 as including an endpoint security control module 120, each of the endpoint communications devices 110a-c may include an endpoint security control module. In addition, although illustrated as separate modules, the endpoint security control module 120 and the network security control module 125 may be included in a common control module in some embodiments.

Figure 2:
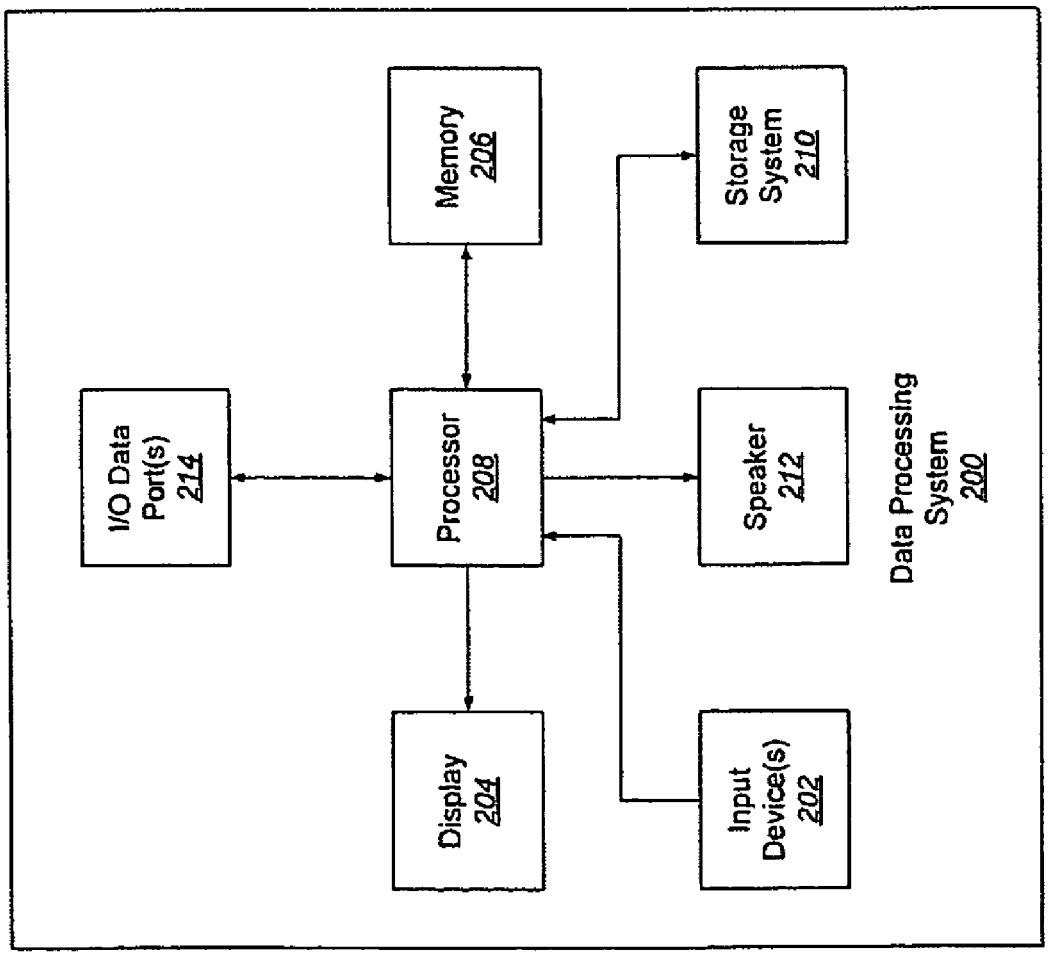
FIG. 2 illustrates a data processing system that may be used to implement a security control module for managing security parameters for a communications session according to some embodiments of the present invention.

Referring now to FIG. 2, a data processing system 200 that may be used to implement the endpoint security control module 120 and/or the network security control module 125 of FIG. 1, in accordance with some embodiments of the present invention, comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, hard disks, or the like, as well as virtual storage, such as a RAMDISK. The I/O data port(s) 214 may be used to transfer information between the data processing system 200 and another computer system or a network (e.g., the Internet). These components may be conventional components such as those used in many conventional computing devices, which may be configured to operate as described herein.

Figure 3:
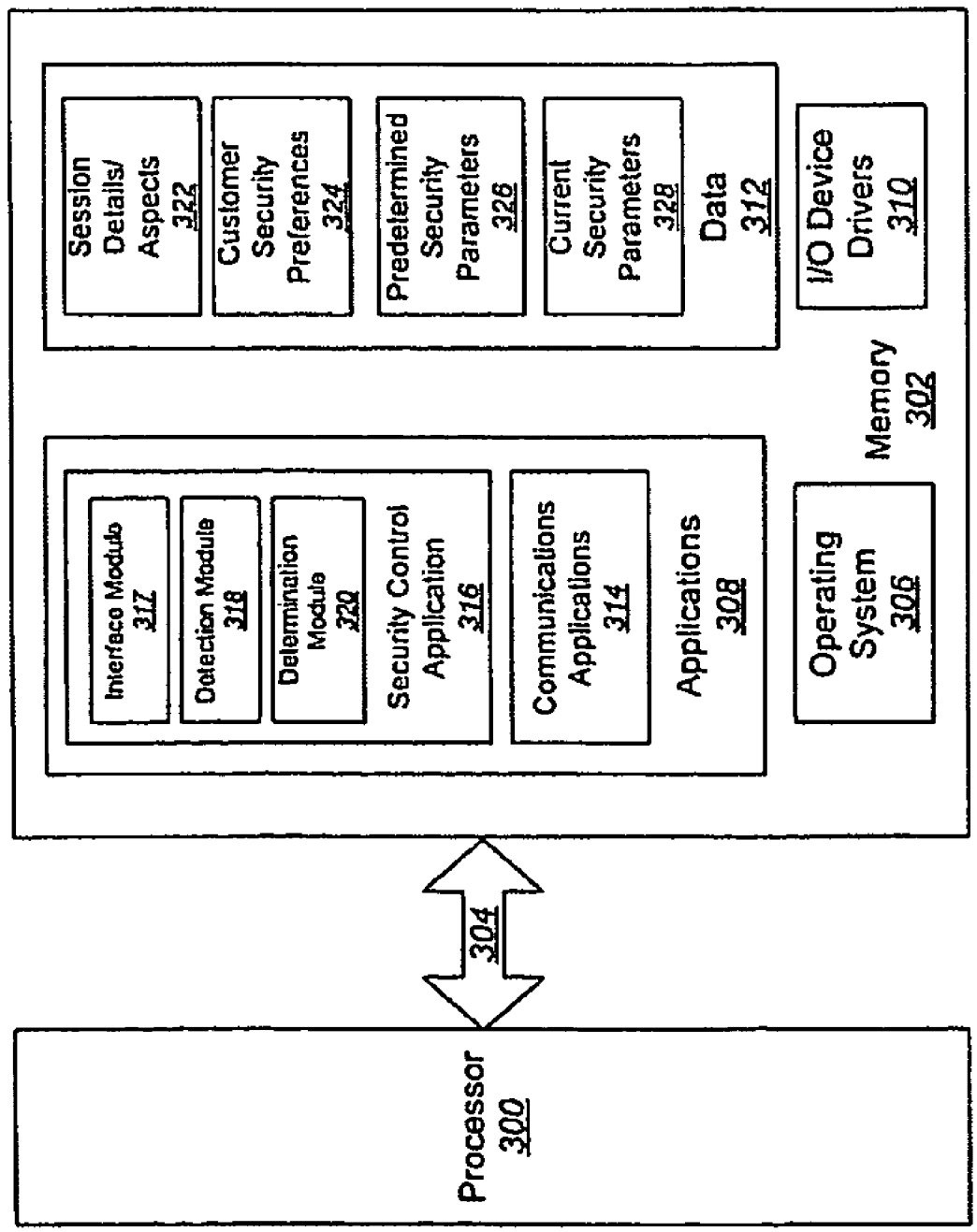
FIG. 3 is a block diagram illustrating a software architecture for a data processing system for managing security parameters for a communications session according to some embodiments of the present invention.

FIG. 3 illustrates a software architecture including a processor 300 and memory 302 that may be used in embodiments of methods, systems, and computer program products for managing security parameters for a communications session in accordance with some embodiments of the present invention. For example, in some embodiments of the present invention, the processor 300 and memory 302 may be used to embody the processor 208 and the memory 206, respectively, of FIG. 2 in the endpoint security control module 120 and/or the network security control module 125 of FIG. 1. The processor 300 communicates with the memory 302 via an address/data bus 304. The processor 300 may be, for example, a commercially available or custom microprocessor. The memory 302 is representative of the overall hierarchy of memory devices containing the software and data used for dynamic management of security parameters for a communications session in accordance with some embodiments of the present invention. The memory 302 may include, but is not limited to, the following types of devices: cache, ROM, PROM, EPROM, EEPROM, flash, SRAM, and DRAM.

As shown in FIG. 3, the memory 302 may include several categories of software and data: an operating system 306, applications programs 308, input/output (I/O) device drivers 310, and data 312. The operating system 306 controls the operation of the data processing system. In particular, the operating system 306 may manage the data processing system's resources and may coordinate execution of programs by the processor 300. The I/O device drivers 310 typically include software routines accessed through the operating system 306 by the application programs 308 to communicate with devices such as the I/O data port(s) 214 of FIG. 2 and other components of the memory 302. The application programs 308 are illustrative of programs that implement the various features of a data processing system according to embodiments of the present invention, and preferably include at least one application which supports operations for managing security parameters for a communications session according to embodiments of the present invention. Finally, the data 312 represents the static and dynamic data used by the application programs 308, the operating system 306, the I/O device drivers 310, and other software programs that may reside in the memory 302.

As further shown in FIG. 3, the application programs 308 may include one or more communications applications 314, and a security control application 316. The security control application 316 may be configured to dynamically assign security parameters during the communications session responsive to changing aspects of the communications session to provide a variable degree of security. The security control application 316 may include an interface module 317, a detection module 318, and a determination module 320. The interface module 317 may be configured to obtain customer security preferences for the communications session. The detection module 318 may be configured to detect the changing aspects of the communications session for a duration of the communications session. The determination module 320 may be configured to determine appropriate security parameters responsive to the detected aspects, to thus select and/or repeatedly update current security parameters with the appropriate security parameters during the communications session.

Still referring to FIG. 3, the data 312 may include data which may be used for managing security parameters for a communications session. In particular, the data 312 may include communications session details/aspects 322, customer security preferences 324, predetermined security parameters 326, and current security parameters 328. The details/aspects 322 of a communications session may be detected by the detection module 318. The aspects 322 of the communications session may include endpoint-visible information and/or network-visible information for the communications session. The customer security preferences 324 may be obtained by the interface module 317. Each of the obtained customer security preferences 324 may be associated with security parameters to update predetermined security parameters 326. The predetermined security parameters 326 may include a list of security parameters associated with particular aspects of a communications session. The aspects 322 of the communications session may be correlated to predetermined security parameters 326 associated with each of the detected aspects by the determination module 320. The predetermined security parameters 326 may also be filtered by the determination module 320 based on a particular one of the communications applications 314 used for the communications session to determine appropriate security parameters for the communications session. For example, if the particular communications applications used for the communications session is capable of supporting only particular ones of the pre-determined security parameters 326, the unusable parameters may be filtered out by the determination module 320. The appropriate security parameters may then be stored as the current security parameters 328 for the session.

Although FIG. 3 illustrates an exemplary software architecture that may facilitate dynamic management of security parameters for a communications session, it will be understood that the present invention is not limited to such a configuration but is intended to encompass any configuration capable of carrying out the operations described herein. For example, while the present invention is described with reference to the security control application 316 as an application program 308, other configurations may also be utilized while still benefiting from the teachings of the present invention. For instance, the security control application 316 may also be incorporated into the operating system 306, the I/O device drivers 310, or other such logical division of the memory 302.

Embodiments of the present invention may take the form of an entirely hardware embodiment, an entirely software embodiment or an embodiment combining software and hardware aspects without departing from the teachings of the present invention. Computer program code for carrying out operations of data processing systems described above with respect to FIGS. 2 and 3 may be written in a high-level programming language, such as C or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller.

According to some embodiments of the present invention, systems, methods and/or computer program products may provide automatic determination and setting of communication security mechanism choices, options, and parameters based on endpoint circumstances and/or pertinent data available at the endpoint, as well as based on communications channel and/or pertinent network information, so as to provide an enhanced level of security for each communications session. In other words, embodiments of the present invention may dynamically detect, determine, and update the current security mechanism choices, options, and parameters responsive to changing aspects of the communications session to provide a variable degree of security (for example, as appropriate to current conditions), without requiring direct user involvement.

Figure 4:
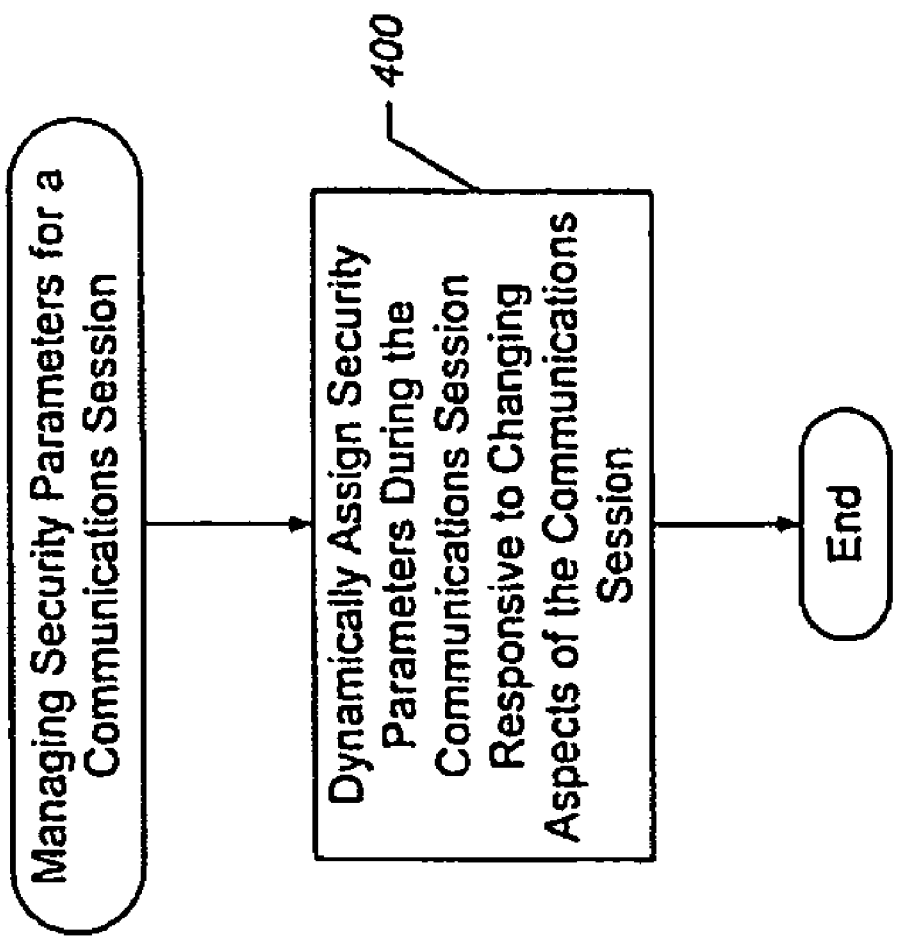
FIGS. 4-7 are flowcharts illustrating operations for managing security parameters for a communications session according to some embodiments of the present invention.

Exemplary operations for managing security parameters for a communications session in accordance with some embodiments of the present invention will now be described with reference to the flowcharts of FIG. 4 through FIG. 7. Referring now to FIG. 4, operations begin at block 400 by dynamically assigning security parameters during a communications session responsive to changing aspects of the communications session. The security parameters may include authentication parameters, encryption parameters, login parameters, and/or hashing parameters. More specifically, examples of security parameters may include algorithms, standard methods, operation modes master key, session key, password/key update rates, password/key lengths, password length and formation rules, login requirements, and/or logging rules.

Still referring to FIG. 4, the changing aspects of the communications session may include endpoint-visible information and/or network-visible information. Endpoint-visible information may include the type of communications session, the contents of the communications session, devices and/or software applications used for the communications session, the connection method and/or interface, and/or parties at each endpoint of the communications session. For example, endpoint-visible information may include information about parties calling and/or being called by a user, such as which parties are simultaneously logged in, particular combinations of parties logged in, and/or the presence and details of particular external memory in place at each endpoint. Rules and/or direct matching associations may be used with the endpoint-visible information to determine the appropriate degree of security needed. For example, the endpoint-visible information may indicate the authentication method for the session should be strong (e.g., two-factor or biometric), weak (e.g., password), or not required. The presence and particulars of concurrently connected networks may also be included as endpoint-visible information. Security parameters associated with these connections (for example, the presence and strength of authentication and/or encryption) may also be included as endpoint-visible information.

Referring again to FIG. 4, network-visible information may include communications channel information for the session, customer profile information and/or information about the purchased level of service, and/or near real-time network conditions in effect at the time of the communications session. For example, network-visible information may include the communications session type, the security ratings and/or historical level of trust and/or status and/or parameters associated with one or more networks to be traversed in the communications session, the owners and/or operators of the networks to be traversed, and/or networks concurrently connected at and/or between each endpoint of the communication session. Information related to the communication itself, such as type, application, content, and/or profiles of parties at each endpoint, may also be included as network-visible information. By dynamically assigning security parameters responsive to these and other changing aspects, a variable degree of security may be provided.

Figure 5:
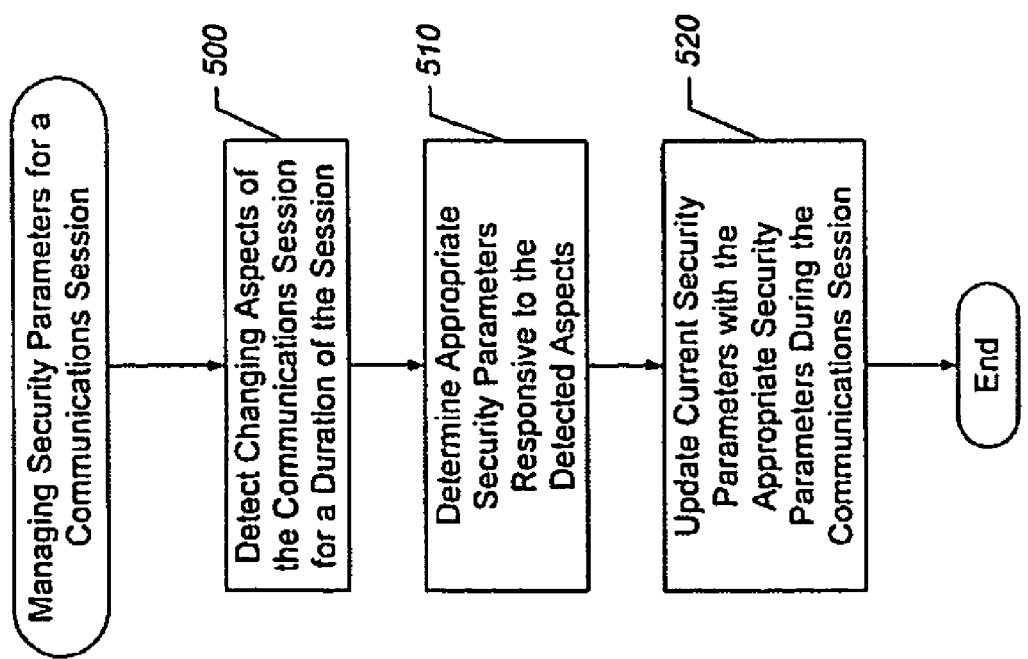

FIG. 5 is a flowchart illustrating additional operations for managing security parameters for a communications session in accordance with some embodiments of the present invention. Referring now to FIG. 5, operations begin at block 500 where the presence and changing aspects of the communications session are detected for a duration of the session. The presence and changing aspects may be detected by monitoring for possible methods and/or actions by which communications can be initiated. Any well-known technical means for detection may be used, such as software API's, operating system calls/interrupts, inter-process communications, network messages, and/or other means. In some embodiments, the detection means may be included as built-in features of a host device operating system. Alternatively, a communications "shim" (similar to the configuration of a "sniffer") placed and operating between the network interface and the rest of the device's functionalities may be used for at least a portion of the detection. The detection may be performed by the network, by endpoint client software, or by some combination of the two.

Still referring to FIG. 5, appropriate security parameters are determined at block 510 responsive to the detected presence and changing aspects of the communications session. The appropriate security parameters may be determined by correlating or matching the detected aspects to predetermined security parameters based on preset rules, customer preferences, and/or parameters actually supported by the pertinent communication application, as will further be described with reference to FIG. 6. The current security parameters for the communications session are then updated with the appropriate security parameters at block 520 during the communications session. The steps of determining appropriate security parameters and updating the current parameters with the appropriate parameters may be repeated periodically and/or as needed for the duration of the communications session to dynamically assign security parameters responsive to changing aspects of the communications session.

Figure 6:
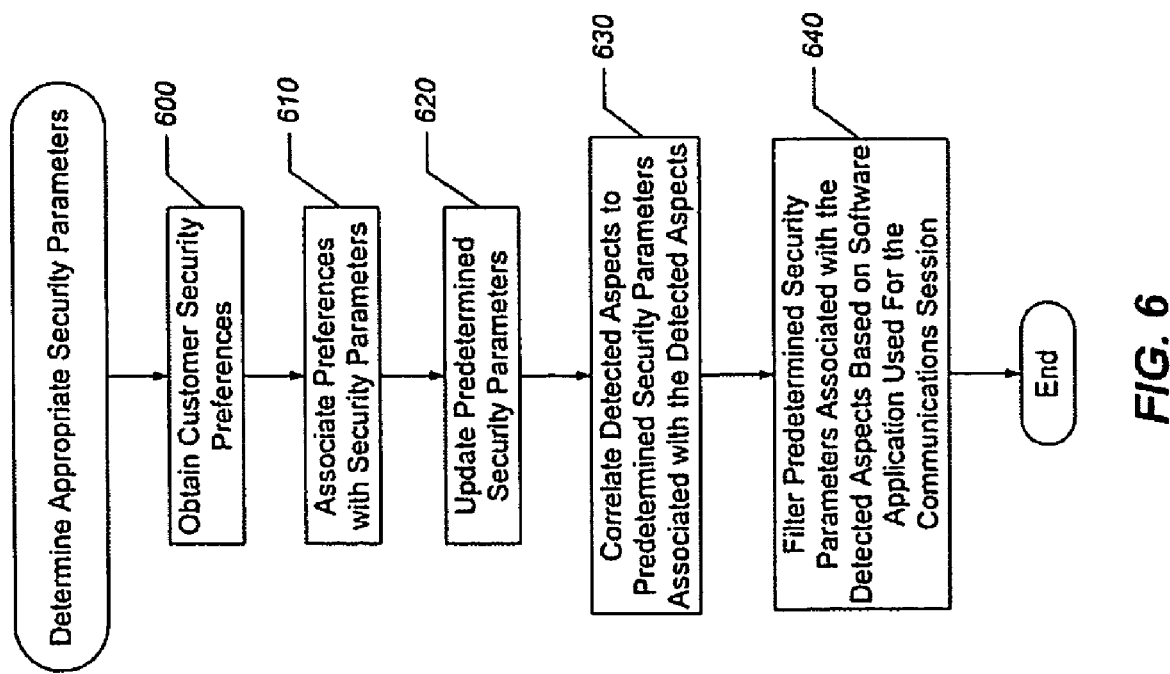

FIG. 6 is a flowchart illustrating detailed operations for determining appropriate security parameters as described with reference to FIG. 5. Now referring to FIG. 6, operations begin at block 600 where security preferences for the communications session are obtained from users/customers of a security management service provider. A customer may select specific communications types or instances to be monitored based on and/or associated with any reasonable pertinent criteria, or alternatively, all potential incoming and/or outgoing communications and communications types may be monitored. Customer security preferences may include preferences for the overall level of security of the communications session, specific levels of security information for particular aspects of the session, and/or specific levels of trust for various other parties to the session.

Still referring to FIG. 6, each of the obtained customer security preferences are then associated with specific security parameters which may be implemented to achieve the desired preferences at block 610. For example, a customer may select an overall security "sensitivity" for a communications session by selecting a particular set of security parameter selection rules. Higher levels of overall sensitivity may be associated with particular security parameters that can provide higher/stronger communications security, and vice versa. Also, a customer may select specific "sensitivities" for various types of and/or specific data, actions, circumstances, and/or other detected aspects by modifying specific security parameter selection rules in a predetermined manner. A relatively higher sensitivity preference for a particular aspect may be associated with security parameters that can provide higher/stronger communications security, and vice versa. Note that, as used herein, the term "security" may include privacy. Where multiple aspects are detected, security parameters associated with the aspect of highest sensitivity may be used. In addition, a customer may select levels of trust (e.g., high, medium, or low) for various other parties to the communications session (e.g., web sites, persons in her directory, companies) by modifying the security parameter selection rules in a predetermined manner. Whenever such a party is present or being communicated with, a relatively lower trust level for that particular party may be associated with security parameters that can provide higher/stronger communications security, and vice versa. Where multiple parties are present, security parameters associated with the lowest-trusted party may be used. The security parameters associated with the customer preferences may then be used to update predetermined security parameters at block 620, which may include updating rules and/or associations used to select or match these parameters with detected aspects of the communications session. The predetermined security parameters may include default security parameters and/or customer-defined security parameters stored in a pre-configured list and associated with particular aspects of a communications session, for example, via selection rules and/or direct matching associations.

Again referring to FIG. 6, operations for determining appropriate security parameters continue at block 630 where detected aspects of the communications session are correlated to predetermined security parameters associated with the detected aspects. More particularly, the detected aspects of the communications session may be matched to aspects from pre-configured stored lists. The list entries may also include predetermined associated security mechanisms/options and security parameter data. The associated security options may be listed in a pre-determined order of priority, e.g. from highest to lowest security, and specific security parameters for each type of security option may be included in each entry. Where multiple options are included, security parameters for each option may be listed in a pre-determined order of priority, e.g. from highest to lowest security. The lists may be arranged in a hierarchical fashion, and rules may be used to access lower levels of the hierarchy when certain matches and/or selections are made at the higher levels. The matched list entries may be accessed to obtain the associated security options and parameters at one level of the hierarchy and/or at multiple levels. In addition, pre-configured rules and/or matching to additional pre-configured lists may be used to exclude some of the list-accessed items based on inconsistent/undesirable combinations of accessed items and/or inconsistent/undesirable combinations of accessed items with detected aspects of the communications session, for example, to avoid known unfavorable combinations with respect to security.

Still referring to FIG. 6, the predetermined security parameters associated with the detected aspects are filtered based on the particular software application used for the communications session at block 640 in order to determine appropriate security parameters for the communications session. More particularly, the associated predetermined security options and/or parameters may be filtered based on whether or not the software application involved in the communication is configured to support them. As such, the filtering may require interfacing with the pertinent software application or communication function, such as by controlling and exchanging pertinent data with the application. Any well-known technical method may be used for the interface, such as API's, system calls/interrupts, and/or other built-in features of the application and host operating system (OS). In some embodiments, the software application may require modification to add necessary API commands and/or data interface capabilities. The filtered security parameters may then be applied to the communications session, starting with the highest priority item of each separate type. If errors occur, the next highest priority parameter of the type associated with the error may be applied to the application and/or an alarm and/or failure indications may be generated. Rules and/or additional pre-configured lists may be used to select from the lower-priority parameters and/or generate alarms and/or failure notifications.

Figure 7:
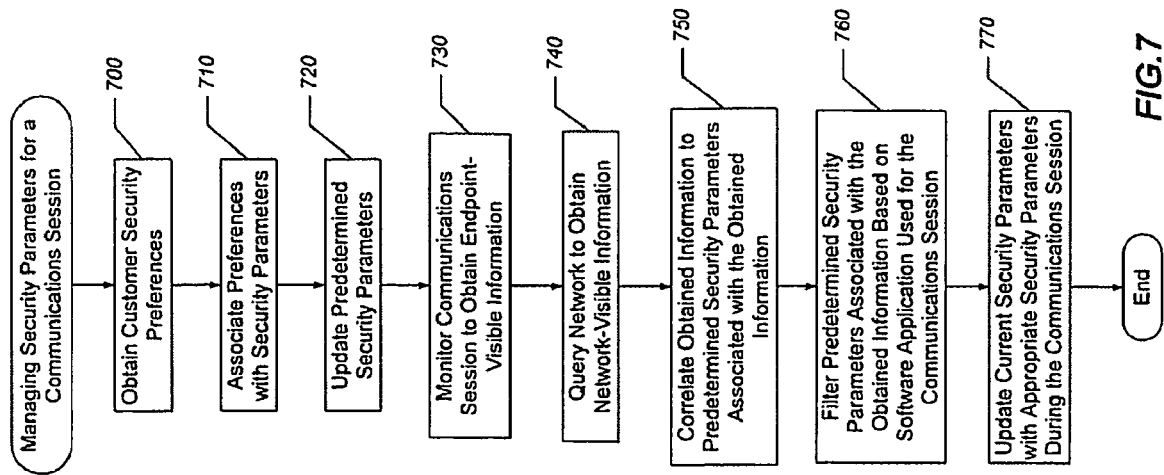

FIG. 7 is a flowchart illustrating detailed operations for managing security parameters for a communications session in accordance with some embodiments of the present invention. Now referring to FIG. 7, operations begin at block 700 where customer security preferences for a communications session are obtained. The obtained security preferences are associated with security parameters which may be implemented to achieve the desired preferences at block 710. Predetermined security parameters, which may include default security parameters and/or previously customer-defined security parameters, are updated using the parameters associated with the obtained security preferences at block 720.

Still referring to FIG. 7, a communications session is detected and monitored at both endpoint (blocks 730) and network (block 740) levels. More particularly, the communications session is monitored to obtain endpoint-visible information at block 730, and the network is queried to obtain network-visible information at block 740. The endpoint-visible information may include the type of communications session, the contents of the communications session, devices and/or software applications used for the communications session, the connection method and/or interface and/or associated parameters, and/or parties at each endpoint of the communications session. The endpoint-visible information may be obtained using well-known technical means for detection, such as software API's, operating system calls/interrupts, communications shims, and/or other means.

The network-visible information may include communications channel information for the session, customer profile and/or purchased level of service information, network conditions, security rating and/or historical trust level and/or status and/or parameters associated with one or more networks to be traversed in the communications session, owners and/or operators of the networks to be traversed, communications session type, and/or networks connected at and/or between each endpoint of the communication session. Network-visible information may be obtained by the network itself, by customer client software, and/or by a combination of the two. The network-visible information may be obtained using well-known technical methods, such as operating system calls, software API's, inter-process communications, network messages, and/or network-based sniffing techniques. More particularly, obtaining the network-visible information may include sending messages to the network for each communications session, querying functionality within the main network (such as various Operations Support Systems, security monitors, intrusion detection systems, firewalls, status reporting units, etc.), and/or querying third-party providers (including other network providers, outsourced operations and security services providers, and/or other pertinent third parties) as needed.

Again referring to FIG. 7, the obtained information from both the endpoint and the network is correlated to predetermined security parameters associated with the obtained information at block 750. The predetermined security parameters associated with the obtained information are then filtered based on the software application used for the communications session to determine appropriate security parameters for the session at block 760. Finally, the current security parameters are updated with the appropriate security parameters during the communications session at block 770. The operations of obtaining endpoint and network visible information, correlating the obtained information to predetermined security parameters, filtering the predetermined security parameters, and updating the current security parameters may be repeated periodically and/or as needed for the duration of the communications session to provide a variable degree of security responsive to changing aspects of the session.

The flowcharts of FIG. 4 through FIG. 7 illustrate the architecture, functionality, and operations of some embodiments of methods, systems, and computer program products for managing security parameters for a communications session. In this regard, each block represents a module, segment, or portion of code, which comprises one or more executable instructions for implementing the specified logical function(s). It should also be noted that in other implementations, the function(s) noted in the blocks may occur out of the order noted in FIG. 4 through FIG. 7. For example, two blocks shown in succession may, in fact, be executed substantially concurrently or the blocks may sometimes be executed in the reverse order, depending on the functionality involved.

Figure 8:
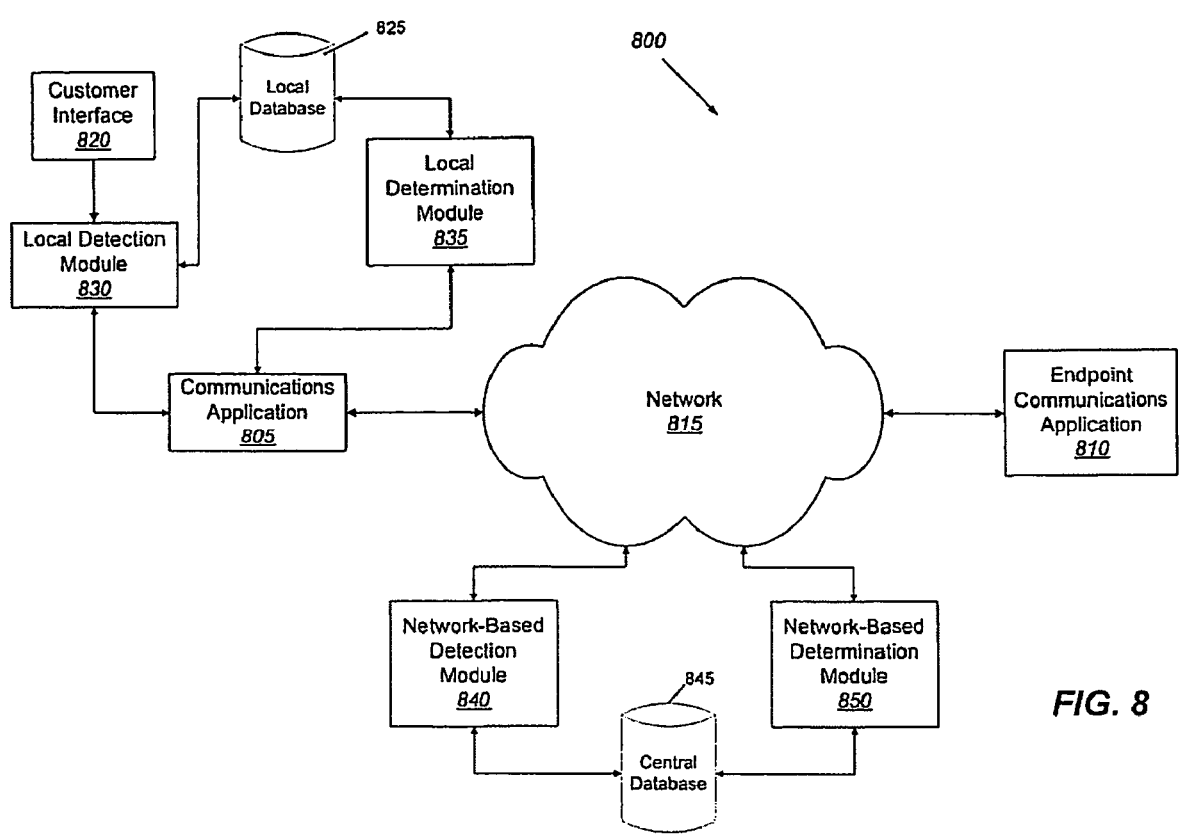
FIG. 8 is a block diagram illustrating a system for managing security parameters for a communications session according to some embodiments of the present invention.

FIG. 8 is a block diagram illustrating components of a system for managing security parameters for a communications session in accordance with some embodiments of the present invention. As shown in FIG. 8, a system 800 for managing security parameters for a communications session includes a customer communications application 805 connected to an endpoint communications application 810 via a network 815 to establish a communications session between a customer and an endpoint. A customer interface 820 obtains customer security preferences, set-up information, and/or other optional information from the customer, and stores the obtained information in a local database 825. A locally-based detection module 830 detects changing aspects of the communications session at the customer's endpoint. In particular, the local detection module 830 monitors the communications session to obtain endpoint-visible information, and stores the obtained endpoint information in the local database 825. A locally-based determination module 835 determines appropriate security parameters for the session responsive to the obtained endpoint information. More specifically, the local determination module 835 consults the local database 825 to determine customer preferences, updates the predetermined endpoint security parameters based on the preferences, and correlates the obtained endpoint information to predetermined endpoint security parameters associated with the obtained information, using rules as appropriate. The local determination module 835 then filters the associated parameters based on the communications application 805 to determine appropriate security parameters, which it provides to the communications application 805. The local determination module 835 may select from the filtered parameters in a predetermined order of priority, and may handle any resulting errors from the communications application 805 by re-selecting parameters as needed and/or by generating alarms and/or failure notifications. The local detection and determination modules 830 and 835, as well as the local database 825 and the customer interface 820, may all be included in the endpoint security control module 120 of FIG. 1.

Still referring to FIG. 8, a system for managing security parameters for a communications session in accordance with some embodiments of the present invention also includes a network-based detection module 840 connected to the network 815. The network detection module 840 detects changing aspects of the communications session which may not be visible from the user's perspective, but may be visible from the network's perspective. In other words, the network detection module 840 queries the network to obtain network-visible information during the communications session, and stores the obtained network information in a central database 845. More particularly, the network detection module 840 may query various functionality within the main network, such as various Operations Support Systems (OSS), security monitors, intrusion detection systems, firewalls, status reporting units, etc. The network detection module 840 may also query third-party providers as needed, including other network providers, outsourced operations and/or security services providers, and/or other pertinent third parties. Network communications may be conducted in a secure fashion, both authenticated and encrypted. For example, the queries may be performed periodically and/or as needed during communications via digitally-signed (e.g., with a private key) messages, and responses may be processed via decryption using the third-party's public key. In some embodiments, multiple distributed network detection modules may be used for improved performance and scalability. The network detection module 840 may also detect endpoint related data and/or conditions, which may also be stored in the central database 845. It should be noted that the entity first detecting a communication instance, whether the local detection module 830 or the network detection module 840, may initiate subsequent actions, and if in the network, may request endpoint information for that instance.

Again referring to FIG. 8, a network-based determination module 850 is connected to the network 815 to determine appropriate security parameters for the communications session responsive to the network-visible information obtained by the network-based detection module 840. More particularly, the network determination module 850 considers the detected information stored in the central database 845, including data and/or conditions detected at the endpoints, by the network, and/or indirectly obtained from pertinent third parties, and correlates the information to predetermined network security parameters associated with the detected information, as described herein. These recommended network security parameters are then sent to the locally-based determination module 835, which performs filtering to limit the parameters to those which are actually usable by the communications application 805. The network-based detection and determination modules 840 and 850, as well as the central database 845, may all be included in the network security control module 125 of FIG. 1.

In some embodiments, a facilitator module may be provided to forward information between the network-based determination module 850 and the locally-based determination module 835. In other words, the facilitator module may serve as a proxy for the network determination module 850. The facilitator module may also provide any set-up functionality that may not be provided by the customer interface 820, and may even provide detection capability for some communications types. In some embodiments, multiple distributed facilitator modules may be used to provide scalability for large numbers of customers.

Still referring to FIG. 8, the local determination module 835 applies the recommended security parameters from the network determination module 850 to the communications application 805 in order of priority for each security category, thereby dynamically modifying the security parameters during the communications session responsive to both endpoint and network-visible information to provide a variable degree of security for the session.

Operations of a system for managing security parameters for a communications session in accordance with some embodiments of the present invention are illustrated by the following example. A customer of a security management service provider obtains a security control software application, such as the security control application 316 of FIG. 3, by downloading the application to her personal computer from the provider. The customer then sets her security preferences for the software via the security control application's customer interface. The security control application monitors all communications on the customer's PC, whether initiated by the customer or by a third party. When the security control application detects an incoming VoIP call (Voice over IP) from the Internet, it begins detection of multiple endpoint-visible aspects of the communications session, including the calling party. The security control application considers all detected aspects and correlates the detected aspects to predetermined security parameters associated with each aspect, noting that the calling party is highly-trusted by the customer. The security control application next filters these parameters by interfacing with the customer's VoIP application software in order to select only those parameters actually usable by that specific software. As such, the security control application selects the highest-priority parameters and applies those to the customer's VoIP application, thereby dynamically assigning security parameters during the communications session responsive to the detected aspects at the endpoint. Receiving no error messages, the security control application returns to monitoring and continuously analyzing detected information.

Meanwhile, a network security control module, such as the network security control module 125 of FIG. 1, also detects the incoming VoIP call, receives messages sent by the customer's VoIP software, looks up the customer's data in a central database, and obtains all pertinent network-level or network-visible information. The network security control module thereby discovers that the customer will be connected to the calling party over only the provider's network, and that security alert levels are currently low with few recent intrusion attempts.

The network security control module then correlates the obtained network-visible information to predetermined security parameters, develops the appropriate parameter modification recommendations to obtain a slight increase in security, and forwards this information to the customer's security control application, which filters the parameters based on those usable by the customer's VoIP software and applies the changes, thereby dynamically modifying the security parameters during the communications session responsive to the detected network conditions.

However, after a while, the customer and the calling party begin discussing financial matters of their business. The security control application detects the content related to their business and to finances, which are two highly "sensitive" items in the customer's preferences, quickly re-selects communication security parameters, and applies selected and filtered encryption and cryptographic authentication parameters to the customer's VoIP software. The VoIP software signals the calling party's software, cryptographic authentication is exchanged for each endpoint, and end-to-end encryption is engaged with appropriate algorithms and key lengths.

Then, sometime during the call, the continued monitoring conducted by the network security control module discovers that the routing of the call has been changed to include traversal of a portion of the Internet operated by a company other than the service provider. As such, the network security control module correlates the newly-detected network information to the predetermined security parameters to provide new recommendations to the security control application at the customer's PC, which filters and applies these parameters so as to achieve strong authentication and encryption of the call. The customer's security control application signals the calling party's software, and strong authentication is performed, with subsequent engagement of strong encryption using large key lengths in order to better protect privacy.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of managing security parameters for an endpoint communications device during a communications session with another communications device, the method comprising:

monitoring the communications session for information visible at the endpoint communications device during the communications session to detect first changing aspects of the communication session;

querying a network device for information not visible at the endpoint communications device during the communications session to detect second changing aspects of the communication session;

determining appropriate security parameters responsive to the detected first and second changing aspects; and dynamically updating current security parameters of the endpoint communications device with the appropriate security parameters during the communications session to provide a variable degree of security for the session responsive to the detected first and second changing aspects.

2. The method of claim 1, wherein determining appropriate security parameters comprises:
   correlating the detected first and second changing aspects to predetermined security parameters associated with each of the detected aspects to determine the appropriate security parameters.

3. The method of claim 2, wherein determining appropriate security parameters further comprises filtering the predetermined security parameters according to a software application used for the communications session to determine the appropriate security parameters that are usable by the software application.

4. The method of claim 2, wherein determining appropriate security parameters further comprises obtaining customer security preferences and associating each of the obtained security preferences with security parameters to update correlation rules and/or the predetermined security parameters.

5. The method of claim 4, wherein the customer security preferences comprise overall level of security for the communications session, specific levels of security information for respective aspects of the communications session, and/or specific levels of trust for respective parties to the communications session.

6. The method of claim 1, wherein the information visible at the endpoint communications device comprises endpoint-visible information including at least one of a type and/or contents of the communications session, devices and/or software applications used for the communications session, method of connection and/or interface, parties at each endpoint of the communications session, and/or endpoint associated parameters.

7. The method of claim 1, wherein the information not visible at the endpoint communications device comprises network-visible information including at least one of communications channel information for the session, customer profile and/or purchased level of service information, network conditions, security rating and/or historical trust level and/or status and/or parameters associated with one or more networks to be traversed in the communications session, owners and/or operators of the networks to be traversed, communications session type, and/or networks connected at and/or between each endpoint of the communication session.

8. A system for managing security parameters for an endpoint communications device during a communications session with another communications device, comprising:
   an electronic device including a security control module therein, the security control module comprising:
      a detection module configured to monitor the communications session for information visible at the endpoint communications device during the communications session to detect first changing aspects of the communication session and configured to query a network device for information not visible at the endpoint communications device during the communications session to detect second changing aspects of the communication session; and
      a determination module configured to determine appropriate security parameters responsive to the detected first and second changing aspects and configured to dynamically update current security parameters of the endpoint communications device with the appropriate security parameters during the communications session to provide a variable degree of security for the session responsive to the detected first and second changing aspects.

9. The system of claim 8, wherein the determination module is configured to correlate the detected first and second changing aspects to predetermined security parameters associated with each of the detected aspects and filter the predetermined security parameters according to a software application used for the communications session to determine the appropriate security parameters that are usable by the software application.

10. The system of claim 9, further comprising an interface module configured to obtain customer security preferences and associate each of the obtained security preferences with security parameters to update correlation rules and/or the predetermined security parameters.

11. The system of claim 8, wherein the detection module comprises a locally-based detection module configured to monitor the communications session for endpoint-visible information and a network-based detection module configured to query the network for network-visible information during the communications session.

12. The system of claim 11, wherein the determination module comprises a network-based determination module configured to correlate the network-visible information to predetermined network security parameters and a locally-based determination module configured to correlate the endpoint-visible information to predetermined endpoint security parameters.

13. A computer program product for managing security parameters for an endpoint communications device during a communications session with another communications device, comprising:
   a tangible computer readable storage medium having computer readable program code embodied therein, the computer readable program code comprising:
   computer readable program code configured to monitor the communications session for information visible at the endpoint communications device during the communications session to detect first changing aspects of the communication session;
   computer readable program code configured to query a network device for information not visible at the endpoint communications device during the communications session to detect second changing aspects of the communication session;
   computer readable program code configured to determine appropriate security parameters responsive to the detected first and second changing aspects; and
   computer readable program code configured to dynamically update current security parameters of the endpoint communications device with the appropriate security parameters during the communications session to provide a variable degree of security for the session responsive to the detected first and second changing aspects.

14. The computer program product of claim 13, wherein the computer readable program code configured to determine appropriate security parameters is configured to correlate the detected first and second changing aspects to predetermined security parameters associated with each of the detected aspects and filter the predetermined security parameters according to a software application used for the communications session to determine the appropriate security parameters that are usable by the software application.

* * * * *